United States Patent Office 2,793,104
Patented May 21, 1957

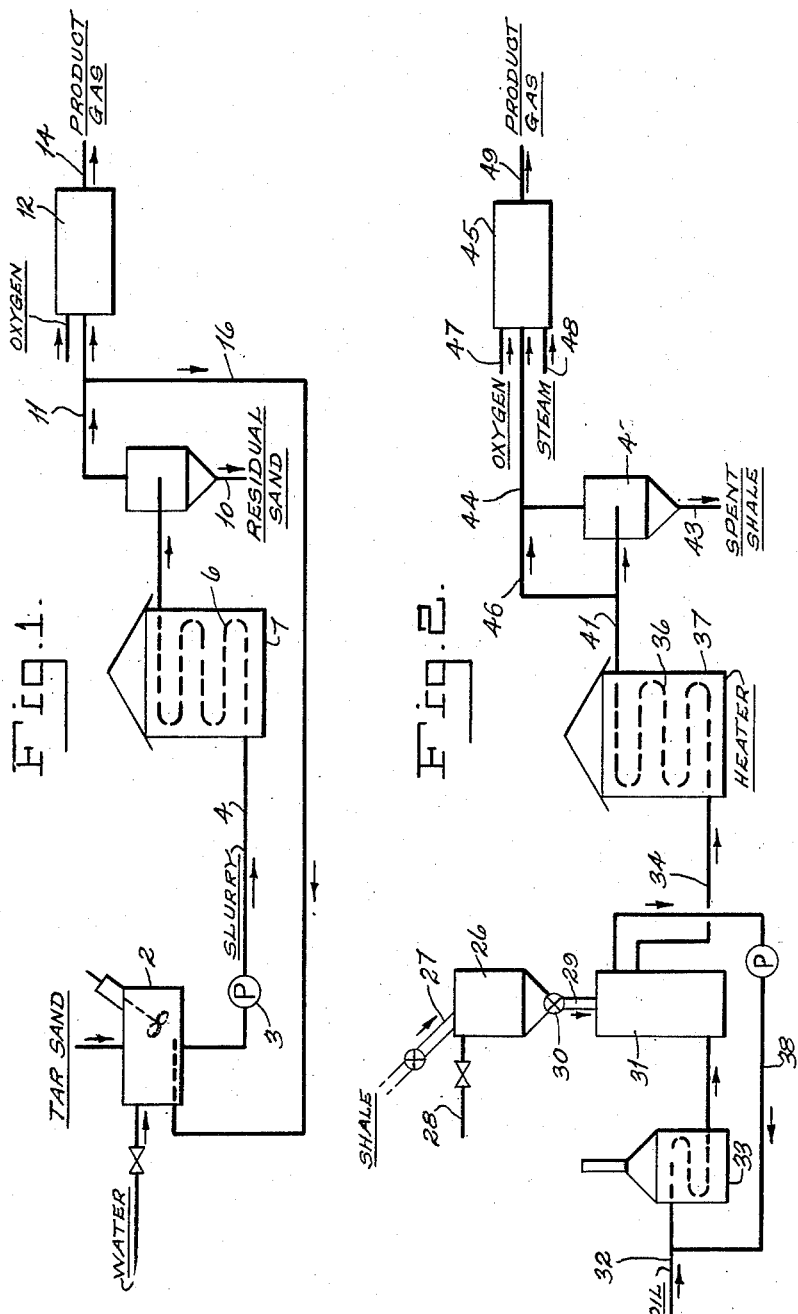

2,793,104

PROCESS FOR THE RECOVERY OF OIL FROM OIL-BEARING MINERALS

Harry V. Rees, Chappaqua, N. Y., assignor to Texaco Development Corporation, New York, N. Y., a corporation of Delaware Continuation of application Serial No. 49,581, September 16, 1948. This application December 29, 1952, Serial No. 328,322

6 Claims. (Cl. 48—197)

This invention relates to a process for the treatment of oil-bearing minerals. The process of this invention is applicable to the treatment of such oil-bearing minerals as oil shale and tar sands. In one of its more specific aspects, this invention relates to a process for the generation of a mixture of carbon monoxide and hydrogen suitable as a source of gaseous fuel or as a source of feed gas for the synthesis of hydrocarbons from oil-bearing minerals.

An object of this invention is to provide an improved process for the recovery of hydrocarbon oils from oil-bearing minerals.

Another object of this invention is to provide an improved process for the recovery of hydrocarbon oils from oil shales.

Still another object of the present invention is to provide an improved process for the generation of carbon monoxide and hydrogen from oil-bearing minerals.

In U. S. Patent 2,735,787, a novel process is disclosed for heating and pulverizing solids. As disclosed in this patent, particles of solid material are admixed with a vaporizable liquid to form a fluid suspension or slurry. The suspension is passed as a confined stream through a heating zone wherein the liquid is vaporized and the solid particles suspended in a stream of the vapor. Appreciable disintegration of the solid particles results from this method of treatment.

In accordance with this invention, particles of the oil-bearing minerals are mixed with a liquid to form a fluid suspension. The suspension is passed through a heating zone wherein it is heated to an elevated temperature at least sufficient to vaporize substantially all of the suspending liquid. The liquid used for suspension should be one which is vaporizable and substantially inert or innocuous with respect to chemical reaction with the oil and mineral matter under the conditions existing in the heating zone.

Water and hydrocarbon oils are preferred liquids for use in the process. Oils which undergo thermal decomposition on heating to form vapors and residual carbonaceous solids are suitable for use in the process of this invention. Deposition of coke in the interior surface of the heating coil is minimized by the mechanical action of the solid materials.

Suitable liquids for use in the process of this invention include water; gasoline, kerosene, naphtha and gas oil fractions of petroleum distillates; aromatic hydrocarbons, e. g., benzene, toluene; paraffins, e. g., hexane, heptane, etc.; naphthenes, e. g., cyclohexane, methylcyclohexane; and the like, and mixtures of these various materials. An oil fraction derived from the oil-bearing mineral itself may be used for making up the suspension.

In a preferred embodiment, the oil-bearing mineral in particle form is admixed with a liquid which may be converted to vapor form on heating. The suspension is passed under conditions of turbulent flow into a tubular heating zone wherein it is heated to a temperature at least sufficient to convert all of the suspending liquid to vapor.

Part or all of the resulting residual solid may be separated from the resulting vapors. Liquid condensed from the vapors may be used in the preparation of the slurry. The residual solid may be separated and discarded, or where combustible matter is still associated with the solid, used for fuel or for the generation of carbon oxides and hydrogen. If desired, the dispersion of residual solid may be passed directly to a combustion zone or gas generator without separation. Residual unvaporized oil or carbonaceous solid associated with the mineral residue is useful for the production of a mixture of carbon monoxide and hydrogen which may be used as fuel gas or as a source of feed gas for the synthesis of hydrocarbons.

The quantity of liquid admixed with the mineral to form a fluid suspension may vary considerably depending upon process requirements and the composition of the feed material. A fluid dispersion in water which may be readily pumped, contains in excess of about 35 weight percent liquid. The liquid content of the suspension may be controlled by first mixing the comminuted mineral with a quantity of liquid in excess of the desired quantity and adjusting the consistency to the desired value by removal of excess liquid in a conventional thickener. The suspension may be readily pumped with suitable equipment, e. g., with a diaphragm type pump, of the type normally used for handling similar suspensions of solids.

The particle size of the mineral fed to the heating zone should be such that the particles remain in suspension under conditions of turbulent flow. Generally, it is preferable to use particles having an effective diameter of less than about one-quarter inch. Finer particle sizes are even more readily handled. It is contemplated that in the usual applications of this process, expensive mechanical pulverization will be unnecessary. Generally oil or tar sands, such as the Athabaska tar sands, comprise inorganic mineral matter which is already of a particle size such that it may be pumped through a heating coil. In the processing of oil shales, the shale need be broken only into relatively large lumps of a size such that they may be readily handled by the conventional conveying equipment. The shale is then disintegrated, in accordance with the process of this invention, into particles of a size suitable for the formation of a suspension by heating it in oil in liquid phase under pressure whereupon the shale is disintegrated to a particle size suitable for the formation of a fluid dispersion.

The temperature of the mixture of oil and shale for disintegration of the shale should be within the range of from about 700° F. to about 900° F. The shale disintegrates more rapidly at the higher temperatures than at the lower temperatures within said range. The pressure in the retort or zone in which the hot oil is contacted with the shale need be sufficient only to insure the presence of oil in liquid phase in said zone. Generally a pressure within the range of 400 to 1000 pounds per square inch is suitable for this purpose. Mechanical means may be employed to aid in the disintegration of the shale and the formation of a fluid suspension.

The suspension of mineral in liquid is heated by passing it through an externally heated zone of restricted cross-sectional area, most suitably a helical tubular heating zone. The heating may be carried out in a furnace such as is commonly used for heating vapor streams in the refining of petroleum. The suspension is fed into the heated tube at a rate sufficient to cause turbulent flow and maintain dispersion of the solid particles in the liquid. The linear velocity of the slurry at the inlet to the heating coil should be within the range of from about ½ to 10 feet per second, suitably about 1 to 2 feet per second. The velocity of the gaseous dispersion of residual solids discharged from the heating coil should be within the range of about 25 to 200 feet per second, suitably about 50 to 100 feet per second.

The temperature at the outlet of the heating coil may range from about 500 to about 1500° F. The temperature should be at least sufficient to insure substantially complete conversion of the liquid used for prepartion of the slurry to vapor. All of the oil from the oil-bearing mineral need not be vaporized; a heavy residual portion of the oil, for example, or a carbonaceous solid residue, may remain on the solid particles of mineral discharged from the outlet of the heating coil. The extent of recovery of oil from the mineral, e. g., distillation of vaporizable constituents therefrom, may be controlled by control of the temperature and pressure at which the heating step is operated and the time of contact between liquid and solid at elevated temperature. The distillation of volatilizable constituents is also dependent to some extent upon the amount and composition of the liquid used for formation of the slurry. Where water is used for the prepartion of the slurry, for example, increasing amounts of water tend to increase the amount of distillation due to the well known partial pressure effects.

Pressure, in itself, is not critical in the heating step. The inter-relationship of temperature and pressure with respect to distillation is well known. Generally, it is desirable to operate the heating step at a pressure near, or only slightly in excess, of atmospheric pressure. In some instances, however, it may be desirable to operate at pressures as high as 300 to 600 pounds per square inch, where the products of the heating step may be utilized efficiently at an elevated temperature and pressure. Considerable pressure drop takes place in the heating zone due to resistance to flow. This drop may be on the order of magnitude of 100 pounds per square inch. Often it is desirable to drop the pressure suddenly in the heating zone or at its outlet to increase the vaporization of volatile constituents of the dispersion.

The separation of gases or vapors from a residual solid may be effected in a number of ways. A cyclone separator is generally effective for removal of solids from gases. A liquid contact type gas scrubber is effective for removal of part or all of the condensible vapors and more or less powdered solid as desired from a gas stream. Other methods of removal include filtration and electrical precipitation.

Important advantages result from the method of recovering hydrocarbon oil from minerals in accordance with the process of this invention. As a dispersion or slurry, the oil-bearing mineral is readily transported and subjected to elevated pressures. Since the slurry may be handled in a manner analogous to handling of a liquid, troublesome lock hoppers and similar devices which are normally required for handling solid materials are eliminated and replaced simply by the slurry preparation equipment and pumps. The slurry may be made up some distance from the processing site and transported thereto by a pipeline. The quantity of material fed to the process may be accurately metered as a slurry of relatively constant controlled composition.

The invention will be more readily understood from the following detailed description and accompanying drawings. It is to be understood that the detailed description of illustrative operations describes preferred embodiments of the invention and that the process of the invention is not limited to the materials and methods specifically described.

Figure 1 is a diagrammatic flow sheet illustrating a preferred method of applying the process of the present invention to the extraction of oil from tar sands.

Figure 2 is a diagrammatic elevational view illustrating a preferred embodiment of the process of the invention as applied to the recovery of hydrocarbon oils from oil shale.

With reference to Figure 1, tar sand is mixed with water in a mixer 2 to form a slurry. The water and sand are heated to a temperature sufficient to insure ready mixing. Emulsifying agents or wetting agents may be used to facilitate mixing. The slurry is passed by pump 3 through line 4 to a heating coil 6 disposed in furnace 7. In the furnace, the slurry is heated to a temperature sufficient to vaporize all of the water.

The resulting mixture of vapors and residual sand is discharged into a cyclone separator 9. Residual sand is withdrawn through line 10 for disposal. The steam and hydrocarbon vapors are discharged from the separator through line 11.

In a typical operation, the slurry is passed into the heating coil at a pressure of 400 pounds per square inch gauge and the temperature at the outlet of the heating coil is 1000° F.

The hydrocarbon vapors and steam discharged from the separator through line 11 are passed to a reaction zone 12 wherein they are reacted with oxygen to produce a mixture of carbon monoxide and hydrogen. Commercial oxygen containing in excess of 95 percent by volume is preferred. The oxygen is admitted to the reaction zone 12 through line 15. Product gas is discharged from the reaction zone through line 14 for use as fuel gas, feed gas for the synthesis of hydrocarbons, or the like. A portion of the vapor stream from line 11 may be passed through line 16 to the mixer 2. These heated vapors supply heat in the mixer, aiding in the formation of a fluid dispersion of tar sand and water.

In a typical operation, oxygen concentrate containing in excess of 95 percent oxygen by volume is supplied to the reactor 12. Reactor 12 is operated at a temperature within the range of from about 2000 to 2600° F. The reaction zone contains a substantially unobstructed reaction space so designed that the ratio of the internal surface of the reaction zone to the surface of a sphere of the same volume is less than 1.5.

With reference to Figure 2, oil shale in the form of relatively coarse lumps is supplied to a lock hopper 26 through line 27. An inert gas is supplied to the hopper 26 through line 28 to build up the pressure within the hopper to the desired value. From the lock hopper the shale is fed through conduit 29 and a rotary valve 30 into a retort 31. Oil from a suitable source enters the system through line 32 and is heated in a heater 33 to a temperature sufficient to heat the shale to the disintegration temperature. From the heater 33 the hot oil stream is passed to retort 31 into contact with the shale.

Sufficient pressure is maintained in the retort to insure the presence of oil in liquid phase. The hot oil stream supplies heat to the shale, dissolving the kerogen and disintegrating the shale to fine particles which are entrained in the oil to form a slurry. The slurry of shale particles in oil is discharged from the retort through line 34, and passed through a heating coil 36 in heater 37 at a velocity sufficient to insure turbulent flow in the heating coil.

In a typical operation, oil shale is broken into lumps about ¼ inch in diameter and fed to the lock hopper 26 until it is filled. A gaseous hydrocarbon is then fed into the hopper through line 28 until a pressure of about 500 pounds per square inch is reached. The shale is then fed through rotary valve 30 into the retort 31 which is operated at a pressure of about 500 pounds per square inch. Shale oil is heated to a temperature of 1000° F. in the heater 33 and passed into contact with the lumps of shale in the retort 31.

A stream of oil is recycled through line 38 to line 32. Part of the oil required for the retort may be supplied in this manner.

Slurry is fed to the heating coil at about 1 foot per second. In the heater 36 the oil is substantially completely vaporized forming a dispersion of spent shale in oil vapors. The spent shale particles and hydrocarbon oil vapors are discharged from the heater coil through line 41 into a cyclone separator 42. Spent shale is separated from the hot hydrocarbon vapors and discharged through line 43. The hydrocarbon vapors pass through line 44 into a gas generator 45 wherein they are reacted with steam and oxygen to produce a mixture of carbon monoxide and hydrogen. Alternatively, the dispersion of shale particles in hydrocarbon vapors may be passed directly to the generator 45 through line 46.

Oxygen is supplied to the generator through line 47 and the steam through line 48. Product gas is discharged from the generator through line 49.

It will be obvious to those skilled in the art that the recovered hydrocarbon vapors from the oil-bearing mineral in either of the above-described preferred embodiments of the invention may find use other than as a feed for the production of carbon monoxide and hydrogen. The process of the present invention, however, is particularly applicable to reaction of the hydrocarbon from the oil-bearing minerals with oxygen and steam to produce carbon monoxide and hydrogen, and, hence, has been so described.

This application is a continuation of Serial No. 49,581, filed September 16, 1948, now forfeited.

Obviously, many modifications and variations of the invention as hereinbefore set forth may be made without departing from the spirit and scope thereof and therefore only such limitations should be imposed as are indicated in the appended claims.

I claim:

1. In the recovery of oil from oil shale wherein a slurry of fine particles of shale in a liquid hydrocarbon oil is heated to vaporize the oil content of the slurry, the improvement which comprises first forming said slurry by contacting a mass of oil shale consisting of lumps about ¼ inch and larger in diameter with a liquid hydrocarbon oil at a temperature in the range of about 700–900° F. effective to cause disintegration of said lumps into fine powder particles which suspend readily in said liquid oil to form a slurry therewith, maintaining said contact for a sufficient period of time to form said slurry, withdrawing said slurry comprising suspended fine particles entrained in said oil, passing said slurry into a tubular heating zone under conditions of turbulent flow, vaporizing all of the suspending oil and the volatilizable portion of the oil from said shale in said heating zone to form a dispersion of solid residue from said shale in oil vapors, discharging the resulting dispersion of oil vapors and solid residue from the heating zone, separating said vapors from the solid residue in said dispersion, and subjecting said vapors to reaction with oxygen at an elevated temperature effective for conversion of hydrocarbons to carbon monoxide and hydrogen.

2. In the recovery of oil from oil shale wherein a slurry of fine particles of shale in a liquid hydrocarbon oil is heated to vaporize the oil content of the slurry, the improvement which comprises first forming said slurry by contacting a mass of oil shale consisting of lumps about ¼ inch and larger in diameter with a liquid hydrocarbon oil at a temperature in the range of about 700–900° F. and a pressure in the range of from about 400 to about 1,000 pounds per square inch gauge effective to cause disintegration of said lumps into fine powder particles which suspend readily in said liquid oil to form a slurry therewith, maintaining said contact for a sufficient period of time to form said slurry, withdrawing said slurry comprising suspended fine particles entrained in said oil, passing said slurry into a tubular heating zone under conditions of turbulent flow, vaporizing all of the suspending oil and the volatilizable portion of the oil from said shale in said heating zone to form a dispersion of solid residue from said shale in oil vapors, discharging the resulting dispersion of oil vapors and solid residue from the heating zone, separating said vapors from the solid residue in said dispersion, and subjecting said vapors to reaction with oxygen at an elevated temperature effective for conversion of hydrocarbons to carbon monoxide and hydrogen.

3. In the recovery of oil from oil shale wherein a slurry of fine particles of shale in a liquid hydrocarbon oil is heated to vaporize the oil content of the slurry, the improvement which comprises first forming said slurry by contacting a mass of oil shale consisting of lumps about ¼ inch and larger in diameter with a liquid hydrocarbon oil at a temperature in the range of about 700–900° F. effective to cause disintegration of said lumps into fine powder particles which suspend readily in said liquid oil to form a slurry therewith, maintaining said contact for a sufficient period of time to form said slurry, withdrawing said slurry comprising suspended fine particles entrained in said oil, passing said slurry into a tubular heating zone under conditions of turbulent flow, vaporizing all of the suspending oil and the volatilizable portion of the oil from said shale in said heating zone to form a dispersion of solid residue from said shale in oil vapors, discharging the resulting dispersion of oil vapors and solid residue from the heating zone at substantially atmospheric pressure and at a temperature within the range of from about 500 to about 1,500° F., separating said vapors from the solid residue in said dispersion, and subjecting said vapors to reaction with oxygen at an elevated temperature effective for conversion of hydrocarbons to carbon monoxide and hydrogen.

4. In the recovery of oil from oil shale wherein a slurry of fine particles of shale in a liquid hydrocarbon oil is heated to vaporize the oil content of the slurry, the improvement which comprises first forming said slurry by contacting a mass of oil shale consisting of lumps about ¼ inch and larger in diameter with a liquid hydrocarbon oil at a temperature in the range of about 700–900° F. effective to cause disintegration of said lumps into fine powder particles which suspend readily in said liquid oil to form a slurry therewith, maintaining said contact for a sufficient period of time to form said slurry, withdrawing said slurry comprising suspended fine particles entrained in said oil, passing said slurry into a tubular heating zone under conditions of turbulent flow, vaporizing all of the suspending oil and the volatilizable portion of the oil from said shale in said heating zone to form a dispersion of solid residue from said shale in oil vapors, discharging the resulting dispersion of oil vapors and solid residue from the heating zone, and subjecting said dispersion to reaction with oxygen at an elevated temperature effective for conversion of hydrocarbons to carbon monoxide and hydrogen.

5. In the recovery of oil from oil shale wherein a slurry of fine particles of shale in a liquid hydrocarbon oil is heated to vaporize the oil content of the slurry, the improvement which comprises first forming said slurry by contacting in a contacting zone a mass of oil shale consisting of lumps about ¼ inch and larger in diameter with a liquid hydrocarbon oil at a temperature in the range of about 700–900° F. effective to cause disintegration of said lumps into fine powder particles which suspend readily in said liquid oil to form a slurry therewith, maintaining said contact for a sufficient period of time to form said slurry, withdrawing said slurry comprising suspended fine particles entrained in said oil, passing said slurry into a tubular heating zone under conditions of turbulent flow, vaporizing all of the suspending oil and the volatilizable portion of the oil from said shale in said heating zone to form a dispersion of solid residue from said shale in oil vapors, discharging the resulting dispersion of oil vapors and solid residue from the heating zone, and separating said vapors from the solid residue in said dispersion.

6. In the recovery of oil from oil shale wherein a slurry of fine particles of shale in a liquid hydrocarbon oil is heated to vaporize the oil content of the slurry, the improvement which comprises first forming said slurry by contacting in a contacting zone a mass of oil shale consisting of lumps about ¼ inch and larger in diameter with a liquid hydrocarbon oil at a temperature in the range of about 700–900° F. effective to cause disintegration of said lumps into fine powder particles which suspend readily in said liquid oil to form a slurry therewith, maintaining said contact for a sufficient period of time to form said slurry, withdrawing said slurry comprising suspended fine particles entrained in said oil, passing said slurry into a tubular heating zone under conditions of turbulent flow, vaporizing all of the suspending oil and the volatilizable portion of the oil from said shale in said heating zone to form a dispersion of solid residue from said shale in oil vapors, discharging the resulting dispersion of oil vapors and solid residue from the heating zone, separating said vapors from the solid residue in said dispersion and returning at least a portion of the vapor constituents to said contacting zone as at least a portion of the hydrocarbon oil constituting said slurry.

References Cited in the file of this patent
UNITED STATES PATENTS

| | | |
|---|---|---|
| 1,447,297 | Day | Mar. 6, 1923 |
| 1,971,728 | Perry | Aug. 28, 1934 |
| 2,174,184 | Bywater | Sept. 26, 1939 |
| 2,436,938 | Scharmann et al. | Mar. 2, 1948 |